US011064030B2

(12) United States Patent
Barton et al.

(10) Patent No.: US 11,064,030 B2
(45) Date of Patent: Jul. 13, 2021

(54) AUTOMATIC ON-BOARDING AGENT FOR IOT EDGE ROUTERS IN CONNECTED VEHICLES

(71) Applicant: Cisco Technology, Inc., San Jose, CA (US)

(72) Inventors: Robert Edgar Barton, Richmond (CA); Jerome Henry, Pittsboro, NC (US); Chui-Tin Yen, Sunnyvale, CA (US); Aamer Saeed Akhter, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 16/655,316

(22) Filed: Oct. 17, 2019

(65) Prior Publication Data

US 2021/0120088 A1 Apr. 22, 2021

(51) Int. Cl.
*H04W 4/00* (2018.01)
*H04L 29/08* (2006.01)
(Continued)

(52) U.S. Cl.
CPC ........ *H04L 67/125* (2013.01); *H04L 12/4679* (2013.01); *H04L 41/0886* (2013.01);
(Continued)

(58) Field of Classification Search
CPC .............. H04L 67/125; H04L 63/0272; H04L 61/2007; H04L 41/0886; H04L 12/4679; H04L 63/20; H04L 61/6059
See application file for complete search history.

(56) References Cited

U.S. PATENT DOCUMENTS 7,036,143 B1 *  4/2006  Leung ................. H04L 63/0272
                                                           709/227
9,775,562 B2  10/2017  Egner et al.
(Continued)

FOREIGN PATENT DOCUMENTS

WO    WO-2018005297 A1 *  1/2018  ......... G06F 9/44505
WO    WO-2018009897 A1 *  1/2018  ............ B60W 40/09
(Continued)

OTHER PUBLICATIONS

Lerner, Jamie, "IPAM is Essential to Network Management", SP360: Service Provider, Cisco Blog, Sep. 17, 2013, 4 pages.
(Continued)

*Primary Examiner* — Jay P Patel
(74) *Attorney, Agent, or Firm* — Behmke Innovation Group LLC; Kenneth J. Heywood; Jonathon P. Western

(57) ABSTRACT

In one embodiment, a master on-boarding agent establishes a virtual private network (VPN) connection with a local on-boarding agent executed by a gateway of a vehicle. The master on-boarding agent receives, via the VPN connection, vehicle data obtained by the local on-boarding agent from a co-pilot system of the vehicle. The master on-boarding agent configures, based on the received vehicle data, the gateway of the vehicle with a network configuration, wherein the network configuration includes an Internet Protocol (IP) address for the gateway. The master on-boarding agent coordinates, based on the network configuration, application of a security policy to the gateway.

20 Claims, 6 Drawing Sheets

(51) Int. Cl.
  *H04L 29/12* (2006.01)
  *H04L 12/24* (2006.01)
  *H04L 29/06* (2006.01)
  *H04L 12/46* (2006.01)

(52) U.S. Cl.
  CPC ...... *H04L 61/2007* (2013.01); *H04L 63/0272* (2013.01); *H04L 63/20* (2013.01); *H04L 61/6059* (2013.01)

(56) References Cited

U.S. PATENT DOCUMENTS

| | | | |
|---|---|---|---|
| 10,117,066 B2 | 10/2018 | Addepalli et al. | |
| 10,249,103 B2 | 4/2019 | Funk | |
| 2008/0004011 A1* | 1/2008 | Ober | H04L 63/0272 455/435.1 |
| 2010/0265878 A1* | 10/2010 | Foxworthy | H04W 36/14 370/316 |
| 2011/0258431 A1* | 10/2011 | Gundavelli | H04L 29/12254 713/150 |
| 2016/0119054 A1* | 4/2016 | Foxworthy | H04B 7/18513 370/319 |
| 2018/0053103 A1* | 2/2018 | Delgado | G06N 5/04 |
| 2018/0062919 A1* | 3/2018 | Justin | H04L 43/087 |
| 2018/0124040 A1* | 5/2018 | Watson | H04L 63/18 |
| 2018/0281598 A1* | 10/2018 | Shu | G05B 19/042 |
| 2018/0302237 A1* | 10/2018 | Sarabia | H04L 63/08 |
| 2018/0302440 A1* | 10/2018 | Hu | H04L 63/20 |
| 2019/0007794 A1* | 1/2019 | Thakur | H04W 4/023 |
| 2019/0039471 A1* | 2/2019 | Moghe | H02J 7/00034 |
| 2019/0174466 A1* | 6/2019 | Zhang | H04W 72/042 |
| 2019/0266498 A1* | 8/2019 | Maluf | G06N 20/00 |
| 2019/0281588 A1* | 9/2019 | Zhang | H04W 52/08 |
| 2019/0308589 A1* | 10/2019 | Maluf | B60R 25/104 |
| 2019/0313446 A1* | 10/2019 | Kim | H04W 4/48 |
| 2019/0387378 A1* | 12/2019 | Willis | H04L 67/12 |
| 2020/0178072 A1* | 6/2020 | Hammond | H04W 12/00506 |
| 2020/0207306 A1* | 7/2020 | Boulton | B60W 30/146 |
| 2020/0207308 A1* | 7/2020 | Boulton | B60R 25/04 |
| 2020/0266850 A1* | 8/2020 | Eaton | H04B 1/3822 |
| 2020/0404069 A1* | 12/2020 | Li | H04W 8/24 |

FOREIGN PATENT DOCUMENTS

| | | |
|---|---|---|
| WO | WO-2018211488 | 11/2018 |
| WO | WO-2019010049 | 1/2019 |

OTHER PUBLICATIONS

"Cisco Kinetic Gateway Management Module (GMM): Provision, monitor, and manage Cisco industrial IoT gateways at scale", Cisco Systems, Inc., 2019, 7 pages.

"Webtech Wireless MDT3100 User Guide", MDT3100 FW2.5 Generic User Guide, version 2.5.1, Webtech Wireless Inc, 2013, 18 pages.

"GMM Overview", online: https://developer.cisco.com/docs/kinetic/#!gmm-overview/gmm-overview, Cisco DevNet, printed Oct. 4, 2019, 2 pages.

* cited by examiner

AUTOMATIC ON-BOARDING AGENT FOR IOT EDGE ROUTERS IN CONNECTED VEHICLES

TECHNICAL FIELD

The present disclosure relates generally to smart transportation systems, and, more particularly, to an automatic on-boarding agent for Internet of Things (IoT) edge routers in connected vehicles.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

In large vehicle IoT networks (e.g., vehicle fleets, mass transit systems, etc.), all vehicles are typically configured in an identical way, including using the same internal Internet Protocol (IP) addressing scheme for each of the subsystems and components of the local network of the vehicle. In essence, each vehicle is treated as its own branch network, with each vehicle being identical, with the exception of its vehicle identifier and address. Unfortunately, on-boarding a vehicle to a vehicle IoT network is a non-trivial act, as it involves touching multiple systems in concert, creating significant overhead on the part of the network administrator and leading to the potential for human error.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
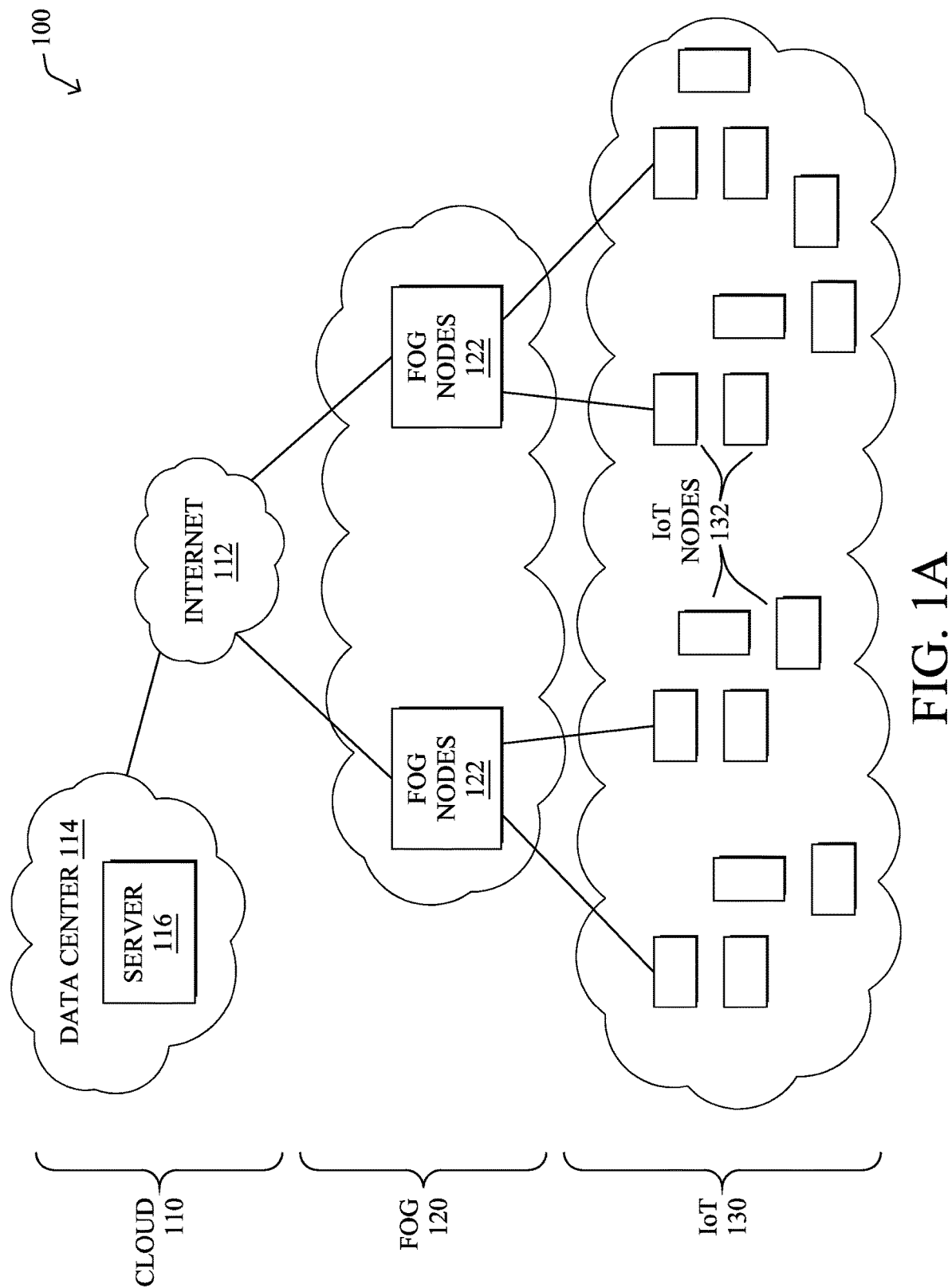
FIGS. 1A-1B illustrate an example communication network.

According to one or more embodiments of the disclosure, a master on-boarding agent establishes a virtual private network (VPN) connection with a local on-boarding agent executed by a gateway of a vehicle. The master on-boarding agent receives, via the VPN connection, vehicle data obtained by the local on-boarding agent from a co-pilot system of the vehicle. The master on-boarding agent configures, based on the received vehicle data, the gateway of the vehicle with a network configuration, wherein the network configuration includes an Internet Protocol (IP) address for the gateway. The master on-boarding agent coordinates, based on the network configuration, application of a security policy to the gateway.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
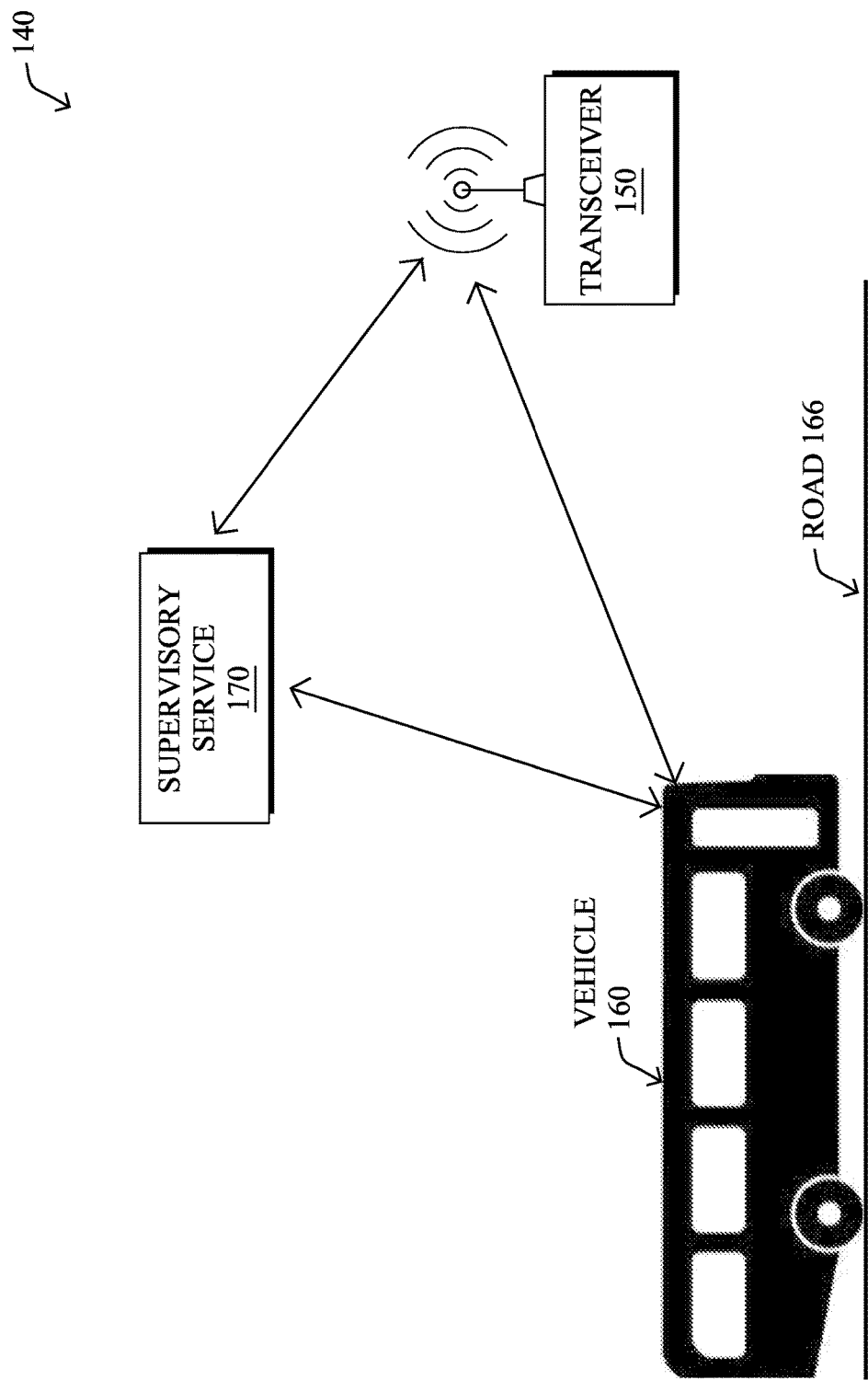

FIG. 1B illustrates an example vehicle communication system 140, according to various embodiments. In particular, vehicle communication system 140 may include any or all of the following components: a vehicle 160, a transceiver 150, and/or a remote supervisory service 170. Generally, vehicle 160 may be any form of vehicle configured to move from one physical location to another such as, but not limited to, cars, buses, trucks, boats, trains, aerial vehicles, and the like. In many cases, vehicle 160 may be configured to transport people and/or cargo. Further, vehicle 160 may be an autonomous vehicle, semi-autonomous vehicle, or manually-operated vehicle, according to the various embodiments herein.

In some embodiments, vehicle communication system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, transceiver 150 comprise a fog node 122 at fog computing layer 120, while vehicle 160 may be viewed as an IoT node 132 at IoT layer 130. Thus, vehicle 160 may communicate directly with transceiver 150, and/or via other IoT nodes 132 (e.g., other vehicles, etc.), and transceiver 150 may provide some degree of processing over the communicated data.

In general, transceiver 150 is configured to communicate with vehicle 160, to provide WAN network access to vehicle 160. For example, transceiver 150 may take the form of a cellular tower, a Wi-Fi access point, a road side unit (RSU), or any other form of communication device configured to communicate with vehicle 160. While the communications between vehicle 160 will typically take the form of wireless communications, further embodiments also provide for transceiver 150 to communicate with vehicle 160 via a hardwired connection. For example, transceiver 150 may be connected via wiring with vehicle 160 during fueling or recharging, etc.

Transceiver 150 may communicate with supervisory service 170 via a WAN, such as the Internet 112 or another WAN, such as a Multiprotocol Label Switching (MPLS) network, or a software-defined (SD)-WAN. For example, transceiver 150 may communicate with supervisory service 170 by leveraging a hardwired network connection, cellular or other wireless connection, satellite connection, or the like.

As would be appreciated, vehicle 160 may comprise its own local network, to allow the various components of vehicle 160 to communicate with one another. For example, vehicle 160 may comprise any number of sub-networks, such as a Controller Area Network (CAN) bus, an IP network, etc., to allow the various systems of vehicle 160 to communicate with one another. Such system may include, but are not limited to, an engine control unit (ECU), a battery management system (BMS) that manages the local battery of vehicle 160, an advanced driver assistance system (ADAS) system, and the like. A local gateway of vehicle 160 may provide communicative connectivity between the local network of vehicle 160 and other devices. For example, the local gateway of vehicle 160 may provide wireless connectivity to transceiver 150 located near road 166 on which vehicle 160 is traveling.

Figure 2:
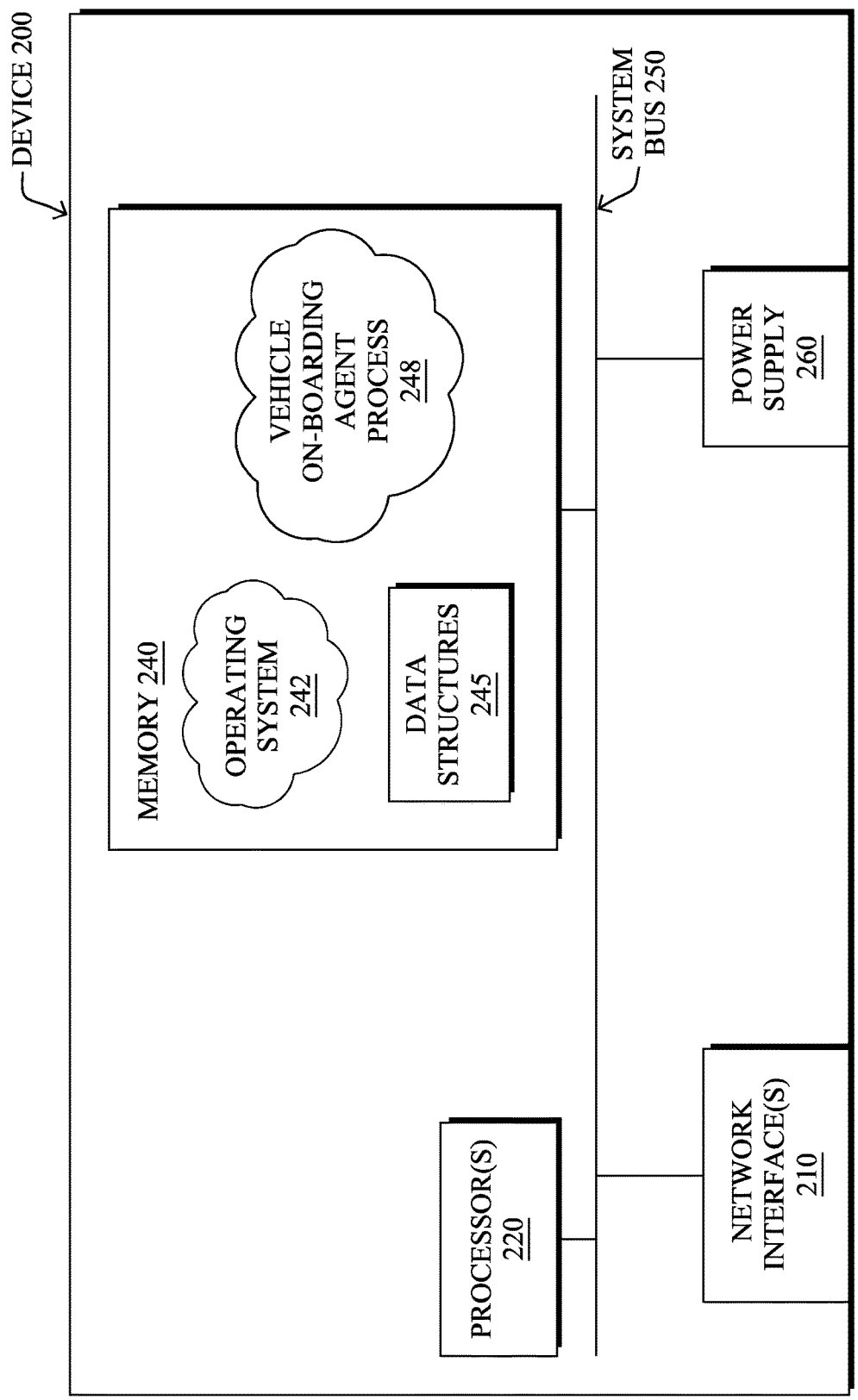
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative vehicle on-boarding agent process 248, as described herein.

Referring again to FIG. 1B, as noted above, vehicles, such as busses, trucks, and the like, are becoming increasingly connected to external networks for purposes of monitoring and management. Typically, each of the vehicles is configured in an identical way, including using the same internal IP scheme for each local component or service of the vehicle. For example, vehicle 160 may include a local Controller Area Network (CAN) Bus, a telematic system, a video surveillance system, a Global Positioning System (GPS) subsystem, a public Wi-Fi network for use by passengers, a transit card or other payment system, etc.

To interface vehicle 160 with supervisory service 170 that oversees the various systems and components of vehicle 160, vehicle 160 may use an IP addressing scheme that essentially treats vehicle 160 as a branch of an enterprise network, with each vehicle being identical, with the exception of its vehicle identifier (ID) and IP address. Unfortunately, on-boarding a vehicle to a vehicle IoT network is a non-trivial act, as it involves touching multiple systems in concert, creating significant overhead on the part of the network administrator and leading to the potential for human error.

Automatic on-Boarding Agent for IoT Edge Routers in Connected Vehicles

The techniques introduced an agent-based mechanism for on-boarding a vehicle to an IoT network in an automated manner. In some aspects, a local agent executed by the vehicle (e.g., on its IoT gateway router) may communicate with a remote master agent, to implement a zero-touch on-boarding process for the vehicle. More specifically, in some embodiments, the local agent on the vehicle may gather specific, contextual information from the local systems of the vehicle and use this information to coordinate all aspects of the on-boarding process, such as IP Address Management (IPAM), subscriber identification module (SIM) configuration, security model creation, etc.

Specifically, according to one or more embodiments of the disclosure as described in detail below, a master on-boarding agent establishes a virtual private network (VPN) connection with a local on-boarding agent executed by a gateway of a vehicle. The master on-boarding agent receives, via the VPN connection, vehicle data obtained by the local on-boarding agent from a co-pilot system of the vehicle. The master on-boarding agent configures, based on the received vehicle data, the gateway of the vehicle with a network configuration, wherein the network configuration includes an Internet Protocol (IP) address for the gateway. The master on-boarding agent coordinates, based on the network configuration, application of a security policy to the gateway.

Illustratively, the techniques described herein may be performed by hardware, software, and/or firmware, such as in accordance with the vehicle on-boarding agent process 248, which may include computer executable instructions executed by the processor 220 (or independent processor of interfaces 210) to perform functions relating to the techniques described herein.

Figure 3:
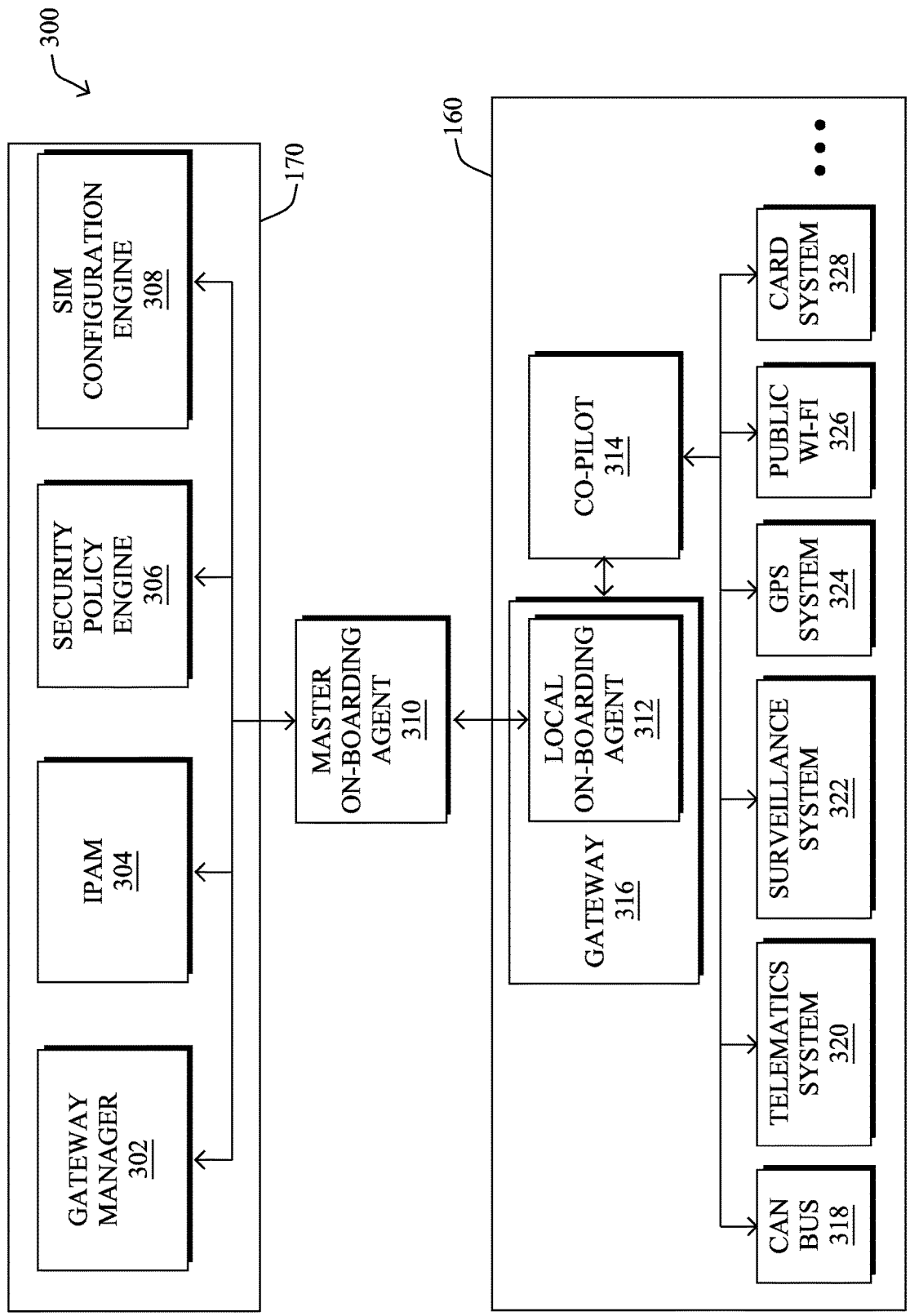
FIG. 3 illustrates an example architecture for on-boarding the IoT gateway of a vehicle.

Operationally, FIG. 3 illustrates an example architecture 300 for on-boarding an IoT gateway of a vehicle, according to various embodiments. As shown, vehicle 160 may comprise any or all of the following components: a co-pilot 314, a gateway 316, a CAN Bus 318, a telematics system 320, a surveillance system 322, a GPS system 324, a public Wi-Fi system 326, a card system 328, combinations thereof, or the like.

In general, CAN Bus 318 may provide local network connectivity to any number of nodes of vehicle 160. For example, CAN Bus 318 may connect any number of electronic control units (ECUs) of vehicle 160, sensors, actuators, etc., to provide monitoring and control over vehicle 160. Depending on the specific configuration of vehicle 160, CAN Bus 318 may link any or all of the other sub-systems 320-328 of vehicle 160.

Telematics system 320 may generally include the various sensors of vehicle 160, such as $O_2$ sensors, temperature sensors, lidar, tire pressure sensors, fuel sensors, backup cameras, and the like. In most cases, the sensors of telematics system 320 may be connected via CAN Bus 318. However, some vehicles are also starting to implement Ethernet networks for their telematics systems.

Surveillance system 322 may include the cameras, display(s), etc. of vehicle 160. Indeed, many mass-transit vehicles include some form of surveillance system, for purposes of monitoring passengers and facilitating emergency responses to medical emergencies, criminal acts, etc.

GPS system 324 may include a GPS receiver that is used to determine the location of vehicle 160 as it travels. Such information is useful for purposes of calculating the estimated time of arrival (ETA) of vehicle 160, directing emergency personnel to vehicle 160, and the like.

In some cases, vehicle 160 may also include a public Wi-Fi system 326 for use by the passengers of vehicle 160. Accordingly, Wi-Fi system 326 may include one or more wireless access points on vehicle 160, as well as the networking infrastructure, to allow passengers to access the Internet while on-board vehicle 160.

Vehicle 160 may further include a card system 328 or other mechanism for authorizing passengers to ride on vehicle 160. For example, card system 328 may include a card reader and processing system to allow passengers of vehicle 160 to scan their transit cards, when entering vehicle 160.

In various embodiments, vehicle 160 may also include a co-pilot 314 that is communicatively connected to any or all of the sub-systems 318-328 of vehicle 160. In general, co-pilot 314 comprises an on-board computer system that provides local management to its connected sub-systems 318-328. Co-pilot 314 may also include a display for use by the driver of vehicle 160 for purposes of presenting the driver with route information, traffic information, driver logs, facilitating phone calls or other communications, etc. Such co-pilot devices are available from Innovation in Traffic System (INIT) and other manufacturers.

As shown, vehicle 160 may include gateway 316, which provides external network connectivity to vehicle 160. For example, gateway 316 may include one or more satellite, cellular, or other wireless transceivers, to communicate with external systems and services, such as supervisory service 170 for vehicle 160, to provide Internet connection to public Wi-Fi system 326, etc.

Also as shown, supervisory service 170 may include any number of sub-services that support vehicle 160, remotely. For example, supervisory service 170 may include a gateway manager 302, an IP address management IPAM sub-service 304, a security policy engine 306, and/or a subscriber identification module (SIM) configuration engine 308. These sub-services 302-308 may be cloud-based, provided by one or more servers in a datacenter associated with vehicle 160, or even located in a network associated with the operator of vehicle 160.

In general, gateway manager 302 may be configured to provide supervisory control over deployed IoT gateways, such as gateway 316 located on vehicle 160. One example of such a gateway manager is Kinetic Gateway Management Module (GMM) by Cisco Systems, Inc. During operation, gateway manager 302 may remotely manage gateway 316, such as by pushing a configuration to gateway 316, monitoring the cellular connectivity and strength of gateway 316, and the like. Accordingly, gateway manager 302 may also provide a user interface (UI) dashboard to an administrator, to allow the administrator to monitor and control gateway 316. In one embodiment, gateway manager 302 may also extend network security mechanisms to gateway 316, such as by forming a VPN tunnel with gateway 316, to protect the communications between gateway 316 and gateway manager 302. For example, FlexVPN by Cisco Systems, Inc., or another suitable VPN system, may be used in architecture 300.

Another potential sub-service of supervisory service 170 is IPAM 304, which is responsible for maintaining a cohesive IP management plan across the various gateways and other devices managed by service 170. For example, IPAM 304 may allow a network administrator to divide and assign blocks of IP addresses in a centralized manner. As shown, for instance, IPAM 304 may be responsible for assigning an IP address to gateway 316.

Security policy engine 306 may generally be responsible for assigning a security policy to the devices managed by supervisory service 170, such as gateway 160. For example, Identity Services Engine (ISE) by Cisco System, Inc., or another suitable security policy engine, may allow an administrator to define and manage security and access policies for gateway 316 and/or any of the endpoint components of vehicle 160 (e.g., by controlling which services or websites are accessible by public Wi-Fi 326, telematics system 320, etc.).

Finally, supervisory service 170 may include a SIM configuration engine 308 responsible for configuring the SIM card(s) of gateway 316, to allow gateway 316 to communicate via a cellular network connection. For example, Jasper Control Center by Cisco Systems, Inc. affords an administrator the ability to manage cellular-connected IoT devices, including activating their SIM cards and associating them with an appropriate cellular billing rate plan, associating a SIM card with an access point name (APN), and other managerial functions.

On-boarding gateway 316 for management by supervisory service 170 is traditionally a non-trivial task for a network administrator. Indeed, from the perspectives of the various sub-services 302-308 of supervisory service 170, identification and management of gateway 316 may differ significantly, thus complicating the on-boarding process for the administrator. Moreover, the administrator may not even be concerned with the underlying information used by sub-services 302-308. For example, the administrator may only care about the identity of vehicle 160, such as "Bus 522," rather than the serial number of gateway 316.

According to various embodiments, on-boarding of gateway 316 can be performed in an automated manner through the use of an on-boarding agent mechanism. More specifically, as shown, the on-boarding mechanism may include a local on-boarding agent 312 executed locally on vehicle 160 and a master on-boarding agent 310 executed remotely from that of vehicle 160 (e.g., in a datacenter, cloud, etc.) that operate in conjunction with one another to on-board gateway 316 for management by supervisory service 170. For example, local on-boarding agent 312 may be executed by gateway 316 (e.g., as a containerized application) or by another device on vehicle 160 in communication therewith. In contrast, master on-boarding agent 310 may be executed centrally, such as in the cloud or a data center, allowing master on-boarding agent 310 to communicate with the local on-boarding agents of any number of vehicles in the fleet.

Figure 4:
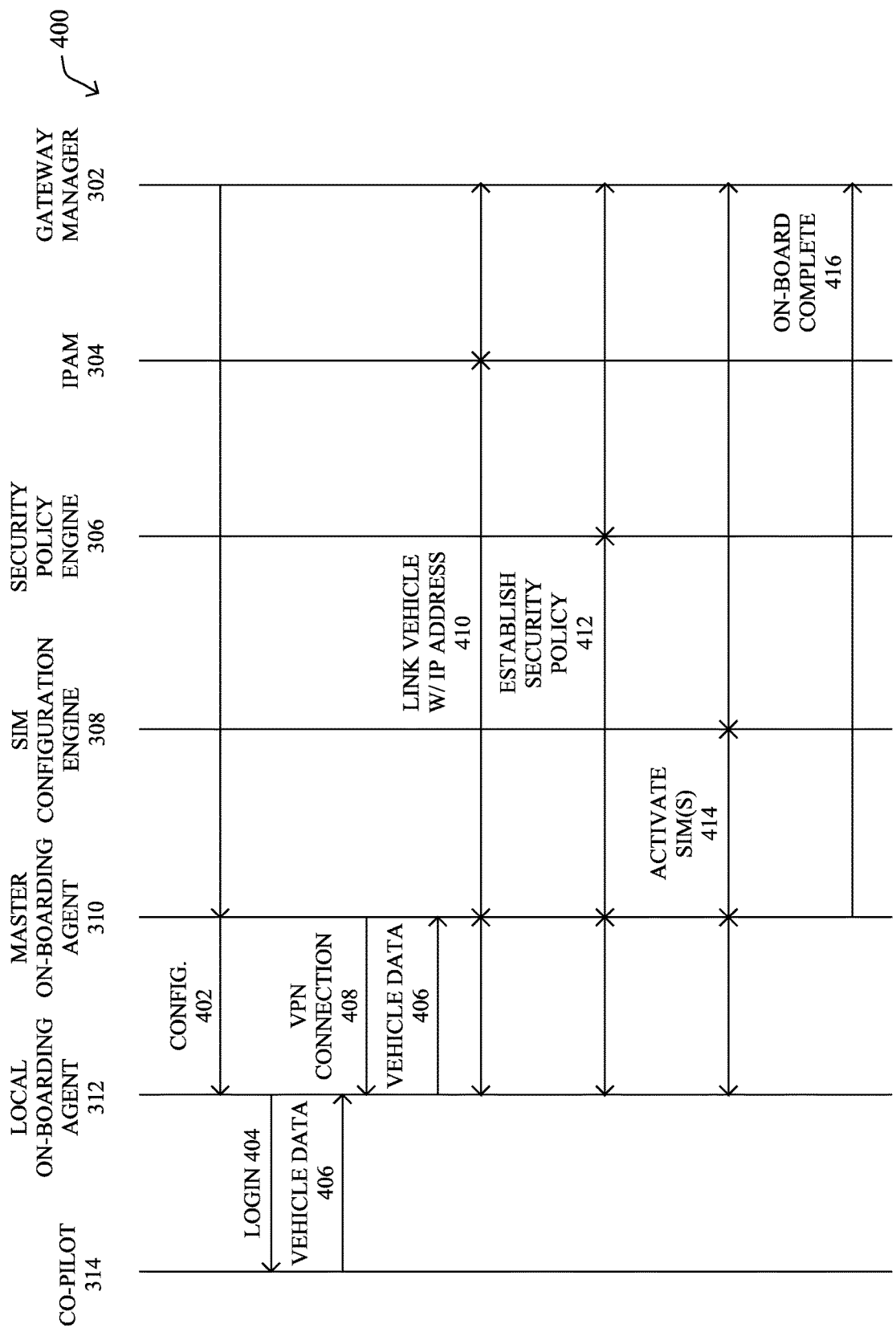
FIG. 4 illustrates an example sequence diagram for on-boarding a vehicle gateway to a network.

FIG. 4 illustrates an example sequence diagram 400 for on-boarding gateway 316 of vehicle 160, according to various embodiments. As shown, sequence diagram 400 illustrates one potential example of the interactions of the various components of architecture 300 in FIG. 3. As would be appreciated, the overall goal of the process is to automate the onboarding of gateway 316 in a seamless, zero-touch manner.

Initially, after physical installation of gateway 316 to vehicle 160, the gateway/router is not yet provisioned. To initiate the on-boarding process, the administrator may 'claim' the gateway via the cloud-based gateway manager 302. Once claimed, gateway manager 302 may push a device-specific configuration 402 to the gateway. For example, gateway manager 302 may push configuration 302 to gateway 316 during its periodic phone home, either directly or via on-boarding agents 310-312.

Once gateway 316 has been claimed, local-on-boarding agent 312 may log into co-pilot 314 using login data 404, to retrieve vehicle data 404. In various embodiments, vehicle data 406 may include information about vehicle 160 such as, but not limited to, the type of vehicle 160 (e.g., a bus, train, airplane, etc.), a vehicle identifier (Vehicle ID) for vehicle 160, the make or model of vehicle 160, usage information for vehicle 160, and/or information available to co-pilot 314 from any of the sub-systems of vehicle 160.

Local on-boarding agent 312 may then cause gateway 316 to establish a VPN connection 408 with the VPN concentrator/head end router (HER) of the vehicle operator, to establish a communication channel between local on-boarding agent 312 and master on-boarding agent 310. In one embodiment, local on-boarding agent 312 may do so using the discovered Vehicle ID as the VPN identity for gateway 316 (e.g., bus-522.company.com), along with an operator-provided secret, such as a certificate or pre-shared key (PSK).

In another embodiment, if local on-boarding agent 312 is unable to obtain vehicle data 406 from co-pilot 314, agent 312 may instead use the serial number of gateway 316 as the VPN identifier (e.g., FTX345234X.company.com), so that gateway 316 can still establish a VPN connection with the HER for purposes of onboarding gateway 316 via master on-boarding agent 310. The HER may, for example, have a different profile for such an identity so that VPN connection 408 can still be established. In some embodiments, this can be accomplished by gateway manager 302 encoding the provided serial number of gateway 316 into a private IPv6 address with /128 route and export it to the HER, so that VPN connection 408 can still be established. In cases in which local on-boarding agent 312 cannot log into co-pilot, it may still periodically attempt to obtain vehicle data 406 from co-pilot 314, even after establishing VPN connection 408 with the HER.

In yet another embodiment, local on-boarding agent 310 may use a bundle ID as the VPN identifier for gateway 316. Such a bundle ID may be formed, for example, by concatenating the IDs of the equipment on vehicle 160 that have been deemed essential for its type or operation (e.g., its GPS receiver, etc.). When one or more pieces of equipment onboard vehicle 160 are replaced, the replaced part ID is matched against a part typology database, such as where the billing model for the SIM card of gateway 316 is also stored. When the part is deemed essential to the vehicle identification, the bundle ID is considered as altered and a new identity for the vehicle is generated. This is the case, for example, when a key function (e.g., autopilot) gets replaced with a new model, different enough from the previous model to warrant a new configuration and identity.

By contrast, when the replaced part is considered as comparable to the previous part, then the bundle ID is used to determine whether the configuration change was minor (e.g., less than x % of the bundle ID string was modified). If so, the new bundle ID is updated dynamically. Conversely, if the configuration change is major (e.g., more than Y % of the vehicle identifying parts and more than Y % of the bundle ID was changed) a new on boarding phase may takes place and new configuration 402 is pushed to the vehicle.

Once VPN connection 408 has been established, local on-boarding agent 312 may provide the vehicle data 406 to master on-boarding agent 310. In turn, master on-boarding agent 310 may coordinate the on-boarding of gateway 316. As noted previously, IPAM 304 is used as the single source of truth and inventory system for all vehicles and their networks. To do so, in some embodiments, IPAM 304 may include tables of the assigned IP address associated to each vehicle ID, as well as its cellular billing rate plan and the security template of each vehicle type. Note that each vehicle must have a known IP address permanently associated to each vehicle ID, similar to the way DNS functions.

As shown, using the vehicle data 406 learned from local on-boarding agent 312 (e.g., the Vehicle ID of vehicle 160, etc.), master on-boarding agent 310 may communicate with IPAM 304 and access specific information for vehicle 160 as part of an exchange 410, to link vehicle 160 with its networking information. For example, such networking information may indicate the IP address, virtual routing and forwarding (VRF) information, etc., for vehicle 160.

In some embodiments, master on-boarding agent 310 may also notify gateway manager 302 of the network information for vehicle 160 obtained from IPAM 304. This allows gateway manager 302, which previously only had knowledge of the serial number of gateway 316, to associate the Vehicle ID of vehicle 160 with the serial number of gateway 316 and its network information from IPAM 304. This allows the administrator using the UI of gateway manager 302 to simply refer to the vehicle ID of vehicle 160, instead of the serial number of gateway 316.

Once master on-boarding agent 310 has established that gateway 316 is correctly installed in vehicle 160 from local on-boarding agent 312, as well as verification from IPAM 304, master on-boarding agent 310 may then initiate an exchange 412 with security policy engine 306, to establish a security policy for gateway 316. For example, master on-boarding agent 310 may call an API associated with engine 306 and create an account for vehicle 160 that includes the network information for gateway 316, such as its IP address from IPAM 304, its VRF assignment (which is translated from the security template for the vehicle), etc. In turn, the security policy is applied to vehicle 160. For example, in Kinetic GMM, the ISE/security policy engine 306 may be leveraged with Radius attributes to generate a configuration for gateway 316 that is deployed via the VPN connection.

Another on-boarding function that master on-boarding agent 310 may perform is the configuration of any SIM card(s) of gateway 316 via exchange 414. For example, master on-boarding agent 310 may use vehicle data 416 and/or any other data obtained from IPAM 304 and/or gateway manager 302, to instantiate the configuration needed by the SIM card(s) of gateway 316 via SIM configuration engine 308. For example, such configuration may entail SIM configuration engine 308 associating the SIM card(s) of gateway 316 with an appropriate billing model with the cellular provider, access point name (APN) configuration, or the like.

Once the configuration of gateway 316 has been updated with its network information from IPAM 304, security policy 306, and/or its SIM card(s) have been configured, master on-boarding agent 310 may send a notification to gateway manager 302, to notify the administrator that gateway 316 has been on-boarded to the network.

In the future, if gateway 316 is replaced or serviced, the above steps can be repeated, as well. In such cases, local on-boarding agent 312 may learn of the replaced gateway 316, securely establish a new connection 408 with master on-boarding agent 410. In this case, since the vehicle data 406 remains the same, such as the Vehicle ID, the new gateway 316 can inherit the same configuration as its predecessor. In other words, the management may continue to be deterministic as various parts of vehicle 160 are serviced or replaced.

Figure 5:
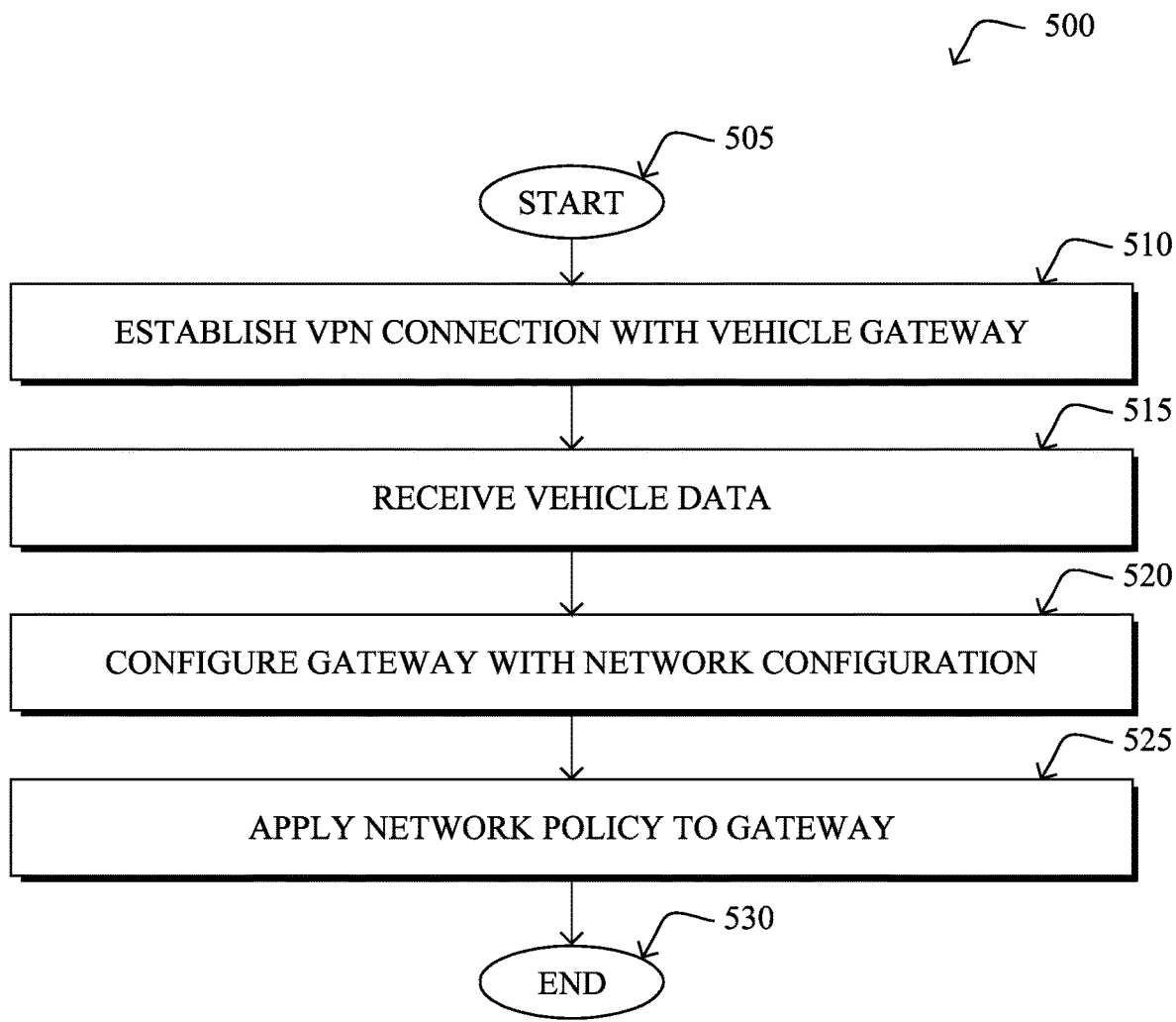
FIG. 5 illustrates an example simplified procedure for on-boarding a vehicle gateway.

FIG. 5 illustrates an example simplified procedure for on-boarding a vehicle gateway, in accordance with one or more embodiments described herein. For example, a non-generic, specifically configured device (e.g., device 200) may perform procedure 500 by executing stored instructions (e.g., process 248). More specifically, procedure 500 may be performed by a master on-boarding agent. The procedure 500 may start at step 505, and continues to step 510, where, as described in greater detail above, the master on-boarding agent may establish a VPN connection with a local on-boarding agent executed by a gateway of a vehicle. In some embodiments, the master on-boarding agent may do so via a head end router located between the gateway and the agent. In various embodiments, the gateway may base its VPN identifier on its serial number, a Vehicle ID obtained by the gateway from a co-pilot system of the vehicle, or a bundle identifier that is a combination of identifiers for components of the vehicle.

At step 515, as detailed above, the master on-boarding agent may receive, via the VPN connection, vehicle information obtained by the local on-boarding agent from the co-pilot system of the vehicle. Such vehicle information may include, for example, a Vehicle ID that uniquely identifies the vehicle within the fleet, type or use information for the vehicle (e.g., that the vehicle is a bus on the silver line in Boston, etc.).

At step 520, the master on-boarding agent may configure, based on the received vehicle data, the gateway of the vehicle with a network configuration, as described in greater detail above. In some embodiments, such a network configuration includes an Internet Protocol (IP) address for the gateway, VFR information, or the like. To do so, in one embodiment, the agent may use the received vehicle data to obtain the IP address and/or other information from an IPAM. In some embodiments, the master on-boarding agent may send the configuration directly to the gateway. In other embodiments, the agent may send the configuration indirectly to the gateway, such as via a gateway manager in charge of the gateway.

At step 525, as detailed above, the master on-boarding agent may also coordinate, based on the network configuration, application of a security policy to the gateway. For example, the gateway of the vehicle may be limited to communicating only with certain services or devices, by policy. In further embodiments, the master on-boarding agent may also configure one or more SIM cards of the gateway, as part of the on-boarding, as well. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the automated onboarding of an IoT gateway for a vehicle, thereby easing the overhead on the network administrator, considerably, and integrating a number of disparate services.

While there have been shown and described illustrative embodiments that provide for the on-boarding of an IoT gateway for a vehicle, it is to be understood that various other adaptations and modifications may be made within the spirit and scope of the embodiments herein. For example, while the techniques herein are described particularly with respect to automobiles, the techniques herein can be applied to any known form of vehicle, such as autonomous vehicles, aerial vehicles, drones, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   establishing, by a master on-boarding agent executing remotely of a vehicle, a virtual private network (VPN) connection with a local on-boarding agent executed by a gateway of the vehicle, wherein the local on-boarding agent and the gateway are executing locally on the vehicle;
   receiving, at the master on-boarding agent and via the VPN connection, vehicle data obtained by the local on-boarding agent from a co-pilot system of the vehicle;
   configuring, by the master on-boarding agent and based on the received vehicle data, the gateway of the vehicle with a network configuration, wherein the network configuration includes an Internet Protocol (IP) address for the gateway; and
   coordinating, by the master on-boarding agent and based on the network configuration, application of a security policy to the gateway.

2. The method as in claim 1, wherein the master on-boarding agent establishes the VPN connection via a head end router.

3. The method as in claim 1, further comprising:
   configuring, by the master on-boarding agent and using the vehicle data, a subscriber identification module (SIM) card of the gateway.

4. The method as in claim 1, wherein the vehicle data obtained by the local on-boarding agent includes a vehicle identifier for the vehicle.

5. The method as in claim 4, further comprising:
   providing, by the master on-boarding agent, the vehicle identifier and the IP address to a cloud-based gateway manager, wherein the gateway manager supervises the gateway via a wide area network (WAN) using the vehicle identifier and the IP address.

6. The method as in claim 4, wherein the local on-boarding agent uses the vehicle identifier as a VPN identifier for the gateway in the established VPN connection.

7. The method as in claim 1, wherein the master on-boarding agent obtains the IP address from an IP address management (IPAM) service using the received vehicle data.

8. The method as in claim 1, wherein the vehicle data obtained by the local on-boarding agent includes a bundle identifier for the vehicle that is a combination of identifiers for components of the vehicle, and wherein the local on-boarding agent uses the bundle identifier as a VPN identifier for the gateway in the established VPN connection.

9. The method as in claim 1, wherein the local on-boarding agent uses a serial number of the gateway as part of a VPN identifier for the gateway in the established VPN connection.

10. The method as in claim 9, wherein the master on-boarding agent receives the serial number of the gateway encoded as a private IPv6 address.

11. An apparatus, comprising:
    one or more network interfaces to communicate with a network;
    a processor coupled to the network interfaces and configured to execute one or more processes; and
    a memory configured to store a process executable by the processor, the process when executed configured to:
       establish a virtual private network (VPN) connection with a local on-boarding agent executed by a gateway of a vehicle, wherein the local on-boarding agent and the gateway are executing locally on the vehicle;
       receive, via the VPN connection, vehicle data obtained by the local on-boarding agent from a co-pilot system of the vehicle;
       configure, based on the received vehicle data, the gateway of the vehicle with a network configuration, wherein the network configuration includes an Internet Protocol (IP) address for the gateway; and
       coordinate, based on the network configuration, application of a security policy to the gateway,
    wherein the apparatus comprises a master on-boarding agent executing remotely of the vehicle.

12. The apparatus as in claim 11, wherein the apparatus establishes the VPN connection via a head end router.

13. The apparatus as in claim 11, wherein the process when executed is further configured to:
configure, using the vehicle data, a subscriber identification module (SIM) card of the gateway.

14. The apparatus as in claim 11, wherein the vehicle data obtained by the local on-boarding agent includes a vehicle identifier for the vehicle.

15. The apparatus as in claim 14, wherein the process when executed is further configured to:
provide the vehicle identifier and the IP address to a cloud-based gateway manager, wherein the gateway manager supervises the gateway via a wide area network (WAN) using the vehicle identifier and the IP address.

16. The apparatus as in claim 14, wherein the local on-boarding agent uses the vehicle identifier as a VPN identifier for the gateway in the established VPN connection.

17. The apparatus as in claim 11, wherein the master on-boarding agent obtains the IP address from an IP address management (IPAM) service using the received vehicle data.

18. The apparatus as in claim 11, wherein the vehicle data obtained by the local on-boarding agent includes a bundle identifier for the vehicle that is a combination of identifiers for components of the vehicle, and wherein the local on-boarding agent uses the bundle identifier as a VPN identifier for the gateway in the established VPN connection.

19. The apparatus as in claim 11, wherein the local on-boarding agent uses a serial number of the gateway as part of a VPN identifier for the gateway in the established VPN connection.

20. A tangible, non-transitory, computer-readable medium storing program instructions that cause a master on-boarding agent to execute a process comprising:
establishing, by the master on-boarding agent which executes remotely of a vehicle, a virtual private network (VPN) connection with a local on-boarding agent executed by a gateway of the vehicle, wherein the local on-boarding agent and the gateway are executing locally on the vehicle;
receiving, at the master on-boarding agent and via the VPN connection, vehicle data obtained by the local on-boarding agent from a co-pilot system of the vehicle;
configuring, by the master on-boarding agent and based on the received vehicle data, the gateway of the vehicle with a network configuration, wherein the network configuration includes an Internet Protocol (IP) address for the gateway; and
coordinating, by the master on-boarding agent and based on the network configuration, application of a security policy to the gateway.

* * * * *